United States Patent [19]
Morishita et al.

[11] Patent Number: 4,716,355
[45] Date of Patent: Dec. 29, 1987

[54] DEVICE FOR CONTROLLING A CHARGING GENERATOR

[75] Inventors: Mitsuharu Morishita; Shinichi Kouge, both of Hyogo, Japan

[73] Assignee: Mitsubishi Denki Kabushiki Kaisha, Tokyo, Japan

[21] Appl. No.: 856,538

[22] Filed: Apr. 24, 1986

Related U.S. Application Data

[63] Continuation of Ser. No. 472,465, Mar. 7, 1983, abandoned.

[30] Foreign Application Priority Data

Mar. 9, 1982 [JP] Japan ................................. 57-38915
Mar. 9, 1982 [JP] Japan ................................. 57-38916

[51] Int. Cl.$^4$ ............................................. H02J 7/14
[52] U.S. Cl. ........................................ 320/64; 322/23; 322/73
[58] Field of Search ................................. 322/22–24, 322/28, 72, 73; 320/64, 68

[56] References Cited

U.S. PATENT DOCUMENTS

| | | | |
|---|---|---|---|
| 3,496,447 | 2/1970 | Thompson | 322/28 X |
| 3,612,982 | 10/1971 | Jones et al. | 322/28 |
| 4,096,429 | 6/1978 | Carter | 322/28 |
| 4,275,344 | 6/1981 | Mori et al. | 322/28 |
| 4,310,793 | 1/1982 | Sheldrake et al. | 320/23 X |
| 4,362,983 | 12/1982 | Mori et al. | 322/28 |
| 4,368,417 | 1/1983 | Matsuyama | 320/64 X |
| 4,384,245 | 5/1983 | Metter | 322/28 |

*Primary Examiner*—R. J. Hickey
*Attorney, Agent, or Firm*—Sughrue, Mion, Zinn, Macpeak & Seas

[57] ABSTRACT

Instead of controlling an output voltage of a charging generator with a fixed value in a voltage regulator which turns a current flowing through a field coil of the charging generator on and off, the output voltage level of the generator can be adjusted by signals from external sensors, so that the generator can be subjected to fine control dependent upon the conditions under which a car carrying the generator is run, and the conditions under which the storage battery is being charged by the charging generator.

6 Claims, 3 Drawing Figures

DEVICE FOR CONTROLLING A CHARGING GENERATOR

This is a continuation of application Ser. No. 472,465, filed 03/07/83 now abandoned.

BACKGROUND OF THE INVENTION

The present invention relates to a device for controlling a charging generator.

Conventional devices for controlling charging generators include a voltage regulator which controls an output voltage of the charging generator so as to equal a prescribed voltage based on a value fixed in the voltage regulator itself. Such a control device however fails to effect fine control of the charging generator output voltage.

SUMMARY OF THE INVENTION

It is an object of the present invention to provide an apparatus for effecting fine control of a charging generator.

According to the present invention, an apparatus for controlling a charging generator includes a voltage regulator for switching a current to a field coil of the charging generator on and off to control an output voltage from the generator so as to equal a reference voltage, and a reference voltage output device operable to indicate any desired reference voltage value to the voltage regulator. The reference voltage in the voltage regulator which controls the output voltage of the charging generator can be varied in response to the conditions under which the car is running and the condition in which the storage battery is being charged, thereby performing fine control of the charging generator.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
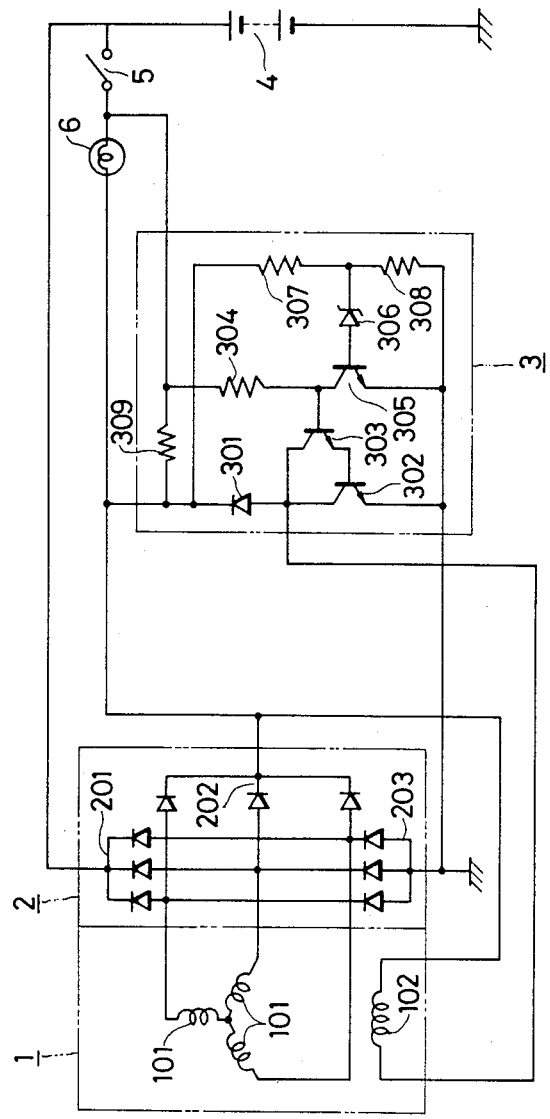
FIG. 1 is a circuit diagram of a conventional device for controlling a charging generator.

The construction and operation of a prior device for controlling a charging generator will be described with reference to FIG. 1.

When a key-operated switch 5 is closed to start an engine, a base current is supplied from a storage battery through the key-operated switch 5 and a resistor 109 to a pair of Darlington-connected transistors 302, 303 which are rendered conductive. When the transistors 302, 303 are energized, a field current flows through a field coil 102 in a loop composed of the storage battery 4, the key-operated switch 5, a charging indicator lamp 6, the resistor 309, the field coil 102, and the transistors 302, 302, thus generating a field magnetomotive force.

When the engine is started at this time, a generator is driven and an a.c. output is induced in armature coils 101 dependent upon the engine RPM. The induced a.c. output is rectified by a full-wave rectifier 2. If the rectified output is lower than a first present value, a zener diode 306 remains nonconductive as the potential at a voltage dividing point of voltage dividing resistors 307, 308 is low. Accordingly, the field current continues to be supplied to the field coil 102, and the output voltage of the generator 1 increases as the RPM thereof increases. When the output voltage of the generator 1 exceeds the first preset value, the potential at the voltage dividing point of the voltage divider becomes larger to the point where the zener diode 306 is rendered conductive, whereupon a base current is supplied to the transistor 305 which is then made conductive. Upon conduction of the transistor 305, the transistors 302, 303 are de-energized to cut off the current flowing through the field coil 102. The output voltage from the generator 1 now begins to be lowered. When the output voltage from the generator 1 drops to lower than the first preset value, the zener diode 306 and the transistor 305 are again turned off, and the transistors 302, 303 are again turned on to energize the field coil 102. The output voltage of the generator 1 is thus increased once again.

The above cycle of operation will be repeated to control the output voltage of the generator 1 so as to be kept at the first preset value, for charging the storage battery 4 at such a controlled voltage. At this time, the output voltage at the second rectifier output terminal 202 is substantially equalized with the first preset value. Since there is now almost no potential difference between the second rectifier output terminal 202 and the storage battery 4, the charging indicator lamp 6 is turned off indicating that the storage battery 4 is being charged.

With the foregoing prior apparatus, the first preset value is fixed within the voltage regulator 3, and cannot be changed as desired from the outside for fine control of the output voltage of the generator in response to the conditions under which the car is running and the conditions under which the storage battery 4 is being charged.

Figure 2:
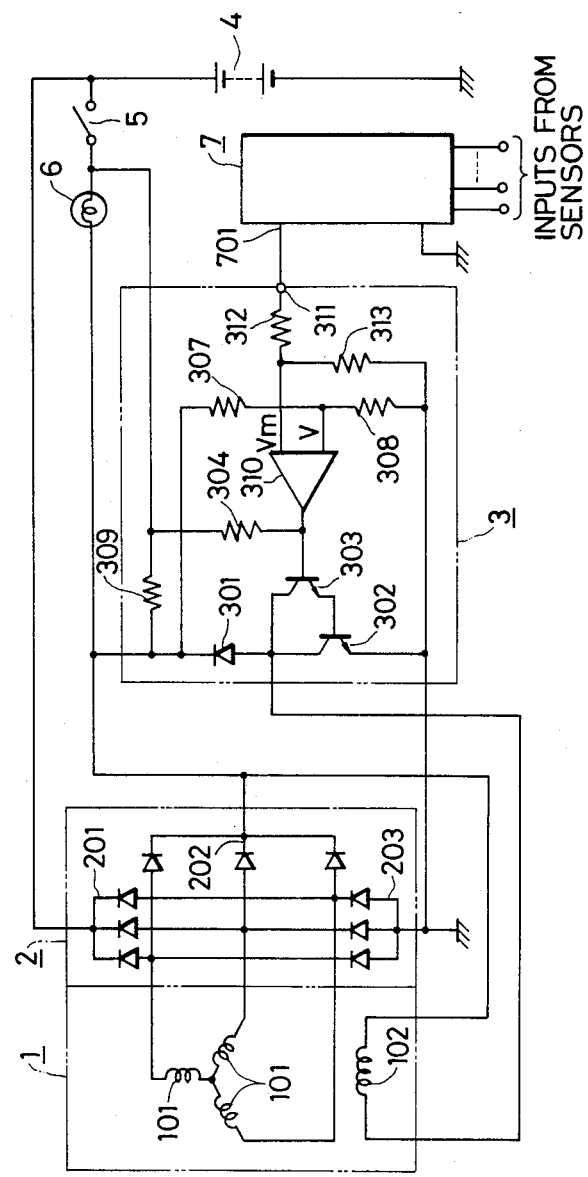
FIG. 2 is a circuit diagram of a device for controlling a charging generator according to a first embodiment of the present invention.

An apparatus for controling a charging generator according to an embodiment of the present invention will now be described with reference to FIG. 2.

A three-phase a.c. generator 1 is installed on a car (not shown) and is drivable by the engine (not shown). The generator 1 has three-phase star-connected armature coils 101 and a field coil 102. An a.c. output from the generator 1 is rectified by a full-wave rectifier 2 having a first rectifier output terminal 201, a second rectifier output terminal 202, and a ground terminal 203. A voltage regulator 3 serves to control the output voltage from the generator 1 so as to equal a first preset value by controlling a field current flowing through the field coil 102.

The voltage regulator 3 comprises a surge absorber diode 301 connected across the field coil 102, a pair of Darlington-connected power transistors 302, 303 for turning the current passing through the field coil 102 on and off, a resistor 304 connected to the base of the transistor 303, a pair of series-connected resistors 307, 308 forming a voltage divider, and an initial excitation resistor 309 connected in parallel to a charging indicator lamp 6 and capable of supplying an initial excitation current to the generator 1 when the charging indicator lamp 6 is disconnected.

The voltage regulator 3 also includes a comparator 310 for comparing the divided voltage from the second rectifier output terminal 202 with a reference voltage to turn the Darlington-connected transistors 302, 303 on and off, a reference voltage input terminal 311, and a pair of series-connected resistors 312, 313 consituting a voltage divider for the reference voltage. A reference voltage output device 7 serves to compute input data from a variety of sensors and issue an optimum voltage setting as a reference voltage to the voltage regulator 3 through a reference voltage output terminal 701. The storage battery 4 to be charged is connected via a key-operated switch 5 to the charging indicator lamp 6.

The operation of the apparatus thus constructed is as follows: When the key-operated switch 5 is closed to start the engine, a field current flows through the field coil 102 in a loop composed of the storage battery 4, the key-operated switch 5, the charging indicator lamp 6, the initial excitation resistor 309, the field coil 102, and the transistors 302, 303. A magnetomotive force is then induced across the field coil 102, and at the same time the charging indicator lamp 6 is lighted. When the engine is started at this time, the generator 1 is driven and a rectified output voltage from the generator 1 is induced at the second rectifier output terminal 202 dependent on the RPM of the generator 1. When a voltage V at the dividing point between the resistors 307, 308 dependent on the voltage at the second rectifier output terminal 202 is smaller than a voltage Vm at the dividing point between the resistors 312, 313 dependent on the reference voltage, the output from the comparator 310 is turned off to keep the transistors 302, 303 energized. The output voltage from the generator 1 continues to increase as the RPM thereof increases.

When the voltage V exceeds the voltage Vm as the RPM of the generator 1 further increases, the output from the comparator 310 is turned on to de-energize the transistors 302, 303, whereupon the current which has been passing through the field coil 102 is cut off, reducing the output voltage of the generator 1. When the output voltage from the generator 1 drops to lower than the reference voltage, the comparator 310 is again de-energized to render the transistors 302, 303 nonconductive to thereby energize the field coil 102. The output voltage from the generator 1 is thus caused to rise again.

The above cycle of operation is repeated to control the output voltage of the generator 1 to equal the reference voltage. The storage battery 4 is charged by the voltage thus controlled. At this time, the voltage difference across the charging indicator lamp 6 falls substantially to zero, and hence the charging indicator lamp 6 is turned off, a condition which indicates that the storage battery 4 is being charged. While in the illustrated embodiment a fixed reference voltage value is given by the reference voltage output device 7 to the reference voltage input terminal 311, a fixed current may be passed such that the voltage between the reference voltage input terminal 311 and ground can serve as a reference voltage corresponding to the fixed current. With this arrangement, the reference voltage at the reference voltage input terminal 311 is expressed by the product of the added series resistances of the resistors 312, 313 and the fixed current.

Figure 3:
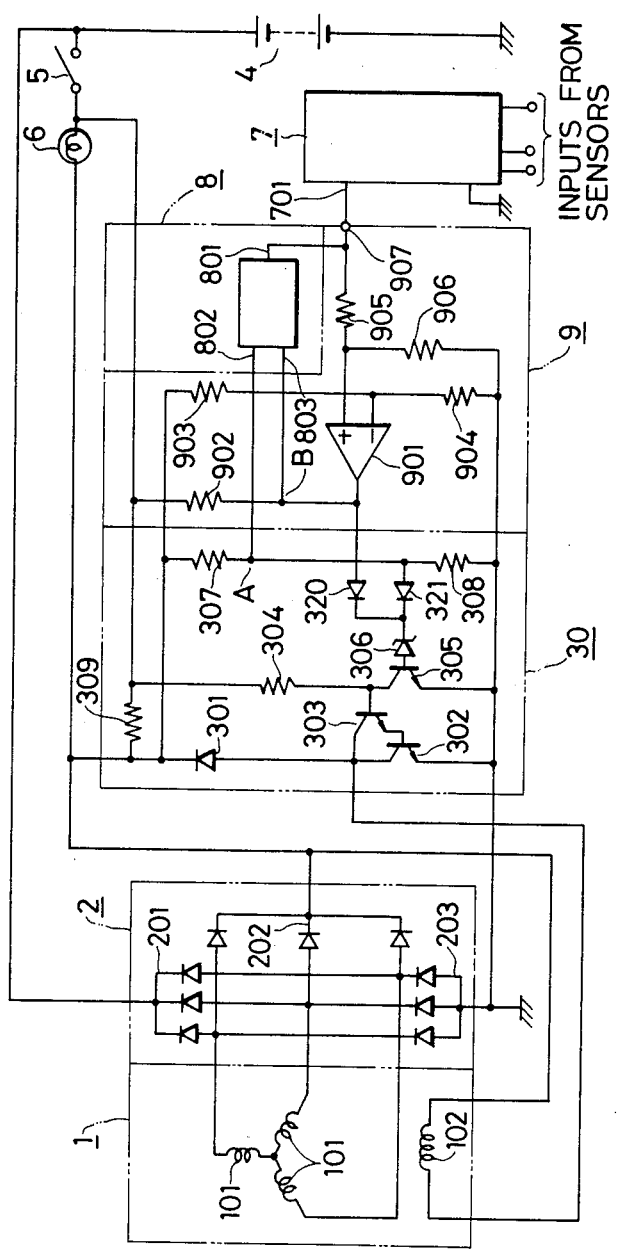
FIG. 3 is a circuit diagram of a device for controlling a charging generator according to a second embodiment of the present invention.

FIG. 3 shows an apparatus according to another embodiment of the present invention. The voltage regulator 30 is of the same construction as that of the voltage regulator 3 shown in FIG. 2 except that the comparator 310 is replaced with a zener diode 306 and a pair of diodes 320, 321 connected in the form of an OR gate. A reference voltage output device 7 serves to compute input data from a variety of sensors and issues an optimum voltage setting as a reference voltage through a reference voltage output terminal 701.

A control switching unit 8 serves to place the voltage regulator 30 selectively in a separately controlled mode in which the voltage regulator 30 is controlled by inputs from the sensors and in a self-controlled mode in which the voltage regulator 30 is controlled by an internal fixed value independently of the inputs from the sensors. More specifically, the voltage regulator 30 is in the separately controlled mode when the reference voltage from the reference voltage output device 7 falls within a preset effective range, and in the self-controlled mode when the reference voltage is outside the preset effective range.

The control switching unit 8 has a reference voltage input terminal 801, a self-controlled mode command output terminal 802 which goes low and grounds a point A when in the separately controlled mode and goes high and directs a self-controlled mode command to the voltage regulator 30 when in the self-controlled mode, and a separately controlled mode command output terminal 803 which goes low and grounds a point B when in the self-controlled mode and goes high and directs a separately controlled mode command to the point B when in the separately controlled mode. A separate-control unit 9 is composed of a comparator 901 for comparing a divided voltage from the second rectifier output terminal 202 with a reference voltage externally commanded and for commanding the voltage regulator 30 to switch the field coil 102 on and off when in the separately controlled mode, a resistor 902 connected to an output terminal of the comparator 901, a pair of series-connected resistors 903, 304 forming a voltage divider for the voltage at the second rectifier output terminal 202, a pair of series-connected resistors 905, 906 forming a voltage divider for the reference voltage, and a reference voltage input terminal 907.

The apparatus of the foregoing construction will operate as follows: When the key-operated switch 5 is closed for starting the engine, a field current is passed through the field coil 102 in a loop composed of the storage battery 4, the key operated switch 5, the charging indicator lamp 6, the initial excitation resistor 309, the field coil 102, and the transistors 302, 303, thus producing a field magnetomotive force and turning on the charging indicator lamp 6. When the reference voltage applied from the reference voltage output device 7 falls within a preset effective range in the control switching unit 8, the latter applies a signal of the logic level L to the point A and a signal of the logic level H to the point B. The voltage regulator 30 is now placed in the separately controlled mode in which the output voltage from the generator 1 is controlled so as to equal the reference voltage which is externally commanded.

When the engine is started at this time, the generator 1 is energized to induce the rectified output voltage at the second rectifier output terminal 202 dependent upon the RPM of the generator 1. When the rectified output voltage generated is below the reference value, the output from the comparator 901 is turned on. Since both the points A, B are grounded, the transistor 305 is supplied with no base current, and hence is de-energized. When the transistor 305 is turned off, the transistors 302, 303 are supplied with a base current through the resistor 304 and kept energized. As a result, the output voltage from the generator 1 keeps on increasing as the RPM of the generator 1 increases. When the voltage at the second rectifier output terminal 202 exceeds the reference voltage as the RPM increases, the comparator 901 is turned off. The transistor 305 is now rendered conductive by being supplied with a base current via the resistor 902, the diode 320 and the zener diode 306. The transistors 302, 303 are then turned off, and the current having been passed through the field coil 102 is suppressed through the diode 301. Simultaneously, the output voltage from the generator 1 is lowered below the reference voltage, whereupon the comparator 901 is turned on again and the transistors 302, 303 are rendered conductive. The field coil 102 is again energized to allow the output voltage from the generator 1 to increase. The foregoing cycle of operation is repeated to control the output voltage from the generator 1 to equal the reference voltage. At this time, the charging indicator lamp 6 is de-energized as the voltage difference thereacross is substantially nil, indicating that the storage battery 4 is being charged. When the reference voltage from the reference voltage output device 7 happens to be outside the preset effective voltage range due to malfunctioning of the reference voltage output device 7 or disconnection of the reference voltage input terminal 907, the control switching unit 8 delivers a signal of the H level to the point A and a signal of the L level to the point B, putting the voltage regulator 30 in the self-controlled mode. The subsequent operation is the same as that of the conventional apparatus shown in FIG. 1, and will not be here described.

While in the above embodiment the fixed reference voltage is applied by the reference voltage output device 7 to the reference voltage input terminal 907 of the separate-control unit 9, a fixed current may be passed to produce a voltage between the reference voltage input terminal 907 and ground, the voltage serving as a reference voltage corresponding to the fixed current thus supplied. At this time, the reference voltage at the reference voltage input terminal 907 is expressed by the product of the added series resistances of the resistors 905, 906 and the fixed current.

With the arrangement of the present invention, as described above, the output voltage from the generator is controlled so as to be equal to a reference voltage which is externally commanded by a corresponding fixed voltage or current applied by the reference voltage output device. The output voltage from the charging generator can thus be controlled to a desired voltage as set in response to inputs from various sensors such, for example, as a car speed sensor or a sensor for detecting the storage battery charging conditions. Therefore, the charging generator can be subjected to finer control as compared with the prior apparatus in which the first preset value was fixedly set by the voltage regulator.

Although certain preferred embodiments have been shown and described, it should be understood that many changes and modifications may be made therein without departing from the scope of the appended claims.

What is claimed is:

1. An apparatus for controlling a charging generator on a vehicle, said generator having armature coils and a field coil for charging a storage battery, comprising:
    (a) a rectifier for rectifying an a.c. output induced in the armature coils into a d.c. output for charging the storage battery;
    (b) a voltage regulator for turning a current flowing through the field coils of the charging generator on and off to control and output voltage of the charging generator so as to be maintained at a reference voltage, said voltage regulator comprising a transistor for controlling the conduction of the field coil of the charging generator, and a comparator comparing the output of the rectifier with the reference voltage to produce an output for turning said transistor on and off; and
    (c) reference voltage output means for setting a desired reference voltage for said voltage regulator; sensor means responsive to engine speed of said vehicle and charging of said storage battery and providing inputs to reference voltage output means for setting said reference voltage for said voltage regulator, and said voltage regulator including means for providing a plurality of modes of control are determined by whether said set reference voltage as a function of said inputs is inside or outside a preset voltage range.

2. An apparatus as claimed in claim 1, including means for controlling said voltage regulator using said set reference voltage only when the latter falls within a preset voltage range.

3. An apparatus as claimed in claim 1, including means for controlling said voltage regulator using an internally fixed reference value when said set reference voltage falls outside a preset voltage range.

4. An apparatus as claimed in claim 1, including means for controlling said voltage regulator using said set reference voltage when the latter falls within a preset voltage range, and using an internally fixed reference value when said set reference voltage falls outside a preset voltage range.

5. An apparatus for controlling a charging generator on a vehicle, said generator having armature coils and a field coil for charging a storage battery, comprising:
    (a) a rectifier for rectifying an a.c. output induced in the armature coils into a d.c. output for charging the storage battery;
    (b) a voltage regulator for turning a current flowing through the field coil of the charging generator on and off to thereby control an output voltage of the charging generator to equal a first preset value when in a self-control mode and to equal an externally commanded reference voltage when in a separately controlled mode;
    (c) a separate-control unit for turning the current flowing through the field coil on and off when in said separately controlled mode;
    (d) reference voltage output means for commanding an external reference voltage to said separate-control unit; and
    (e) a control switching unit for placing said voltage regulator in said self controlled mode when said externally commanded reference voltage falls outside said preset voltage range; wherein said voltage regulator comprises a transistor for controlling the conduction of the field coil of the charging generator, said separate-control unit comprising a comparator for comparing the output voltage of the charging generator with said externally commanded reference voltage and producing an output for turning said transistor in said voltage regulator on and off.

6. An apparatus as claimed in claim 5, wherein said reference voltage output means for setting said reference voltage for said voltage regulator receives inputs from sensors responsive to vehicle speed and charging of said storage battery.

* * * * *